United States Patent
Barnikow et al.

(10) Patent No.: US 7,874,285 B2
(45) Date of Patent: Jan. 25, 2011

(54) METHOD AND DEVICE FOR MONITORING AN EXHAUST GAS PROBE

(75) Inventors: Stefan Barnikow, Bad Abbach (DE); Michaela Schneider, Wiesenfelden (DE); Norbert Sieber, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 314 days.

(21) Appl. No.: 11/906,898

(22) Filed: Oct. 4, 2007

(65) Prior Publication Data
US 2008/0083211 A1    Apr. 10, 2008

(30) Foreign Application Priority Data
Oct. 5, 2006    (DE)    ......................... 10 2006 047 190

(51) Int. Cl.
 *F02D 41/00*    (2006.01)
 *G01M 19/00*    (2006.01)
 *G01M 15/00*    (2006.01)

(52) U.S. Cl. ........................ 123/688; 701/109; 701/106; 701/103; 73/114.73; 73/114.72; 204/401

(58) Field of Classification Search ................ 123/688, 123/674, 690; 701/101, 109, 114; 73/114.69–114.73; 204/401
See application file for complete search history.

(56) References Cited
U.S. PATENT DOCUMENTS 4,991,102 A * 2/1991 Sakamoto et al. ........... 701/109

| 5,370,101 | A | * | 12/1994 | Hamburg et al. | ............ 123/688 |
|---|---|---|---|---|---|
| 5,417,099 | A | * | 5/1995 | Ohuchi | ....................... 73/23.32 |
| 5,511,526 | A | * | 4/1996 | Hamburg et al. | ....... 123/406.55 |
| 5,651,353 | A | * | 7/1997 | Allston | ........................ 123/673 |
| 5,769,063 | A | * | 6/1998 | Mizusawa | .................... 123/688 |
| 5,996,337 | A | * | 12/1999 | Blosser et al. | ................. 60/274 |
| 6,105,366 | A | * | 8/2000 | Zhang | ........................... 60/274 |
| 6,148,808 | A | * | 11/2000 | Kainz | ........................... 123/673 |

FOREIGN PATENT DOCUMENTS

DE    44 20 818 A1    8/1995
DE    197 52 965 A1    6/1999

OTHER PUBLICATIONS

Richard Van Basshuysen, Fred Schäfer; "Handbuch Verbrennungsmotor"; "Internal Combustion Handbook"; $2^{nd}$ Edition; Jun. 2002; pp. 559-561; Vieweg and Sohn Verlagsgesellschaft mgH, Germany.

* cited by examiner

*Primary Examiner*—Stephen K Cronin
*Assistant Examiner*—Raza Najmuddin
(74) *Attorney, Agent, or Firm*—King & Spalding L.L.P.

(57) ABSTRACT

Depending on a trim controller diagnosis, a suspicion marker for an asymmetric ageing of the exhaust gas probe is allocated either a "true" value or a "false" value and, if the value of the suspicion marker is "true", a dynamic diagnosis will be performed based on the exhaust gas probe's measuring signal, on the basis of the results of which diagnosis either an asymmetrically aged or a non-asymmetrically aged exhaust gas probe will be detected.

7 Claims, 7 Drawing Sheets

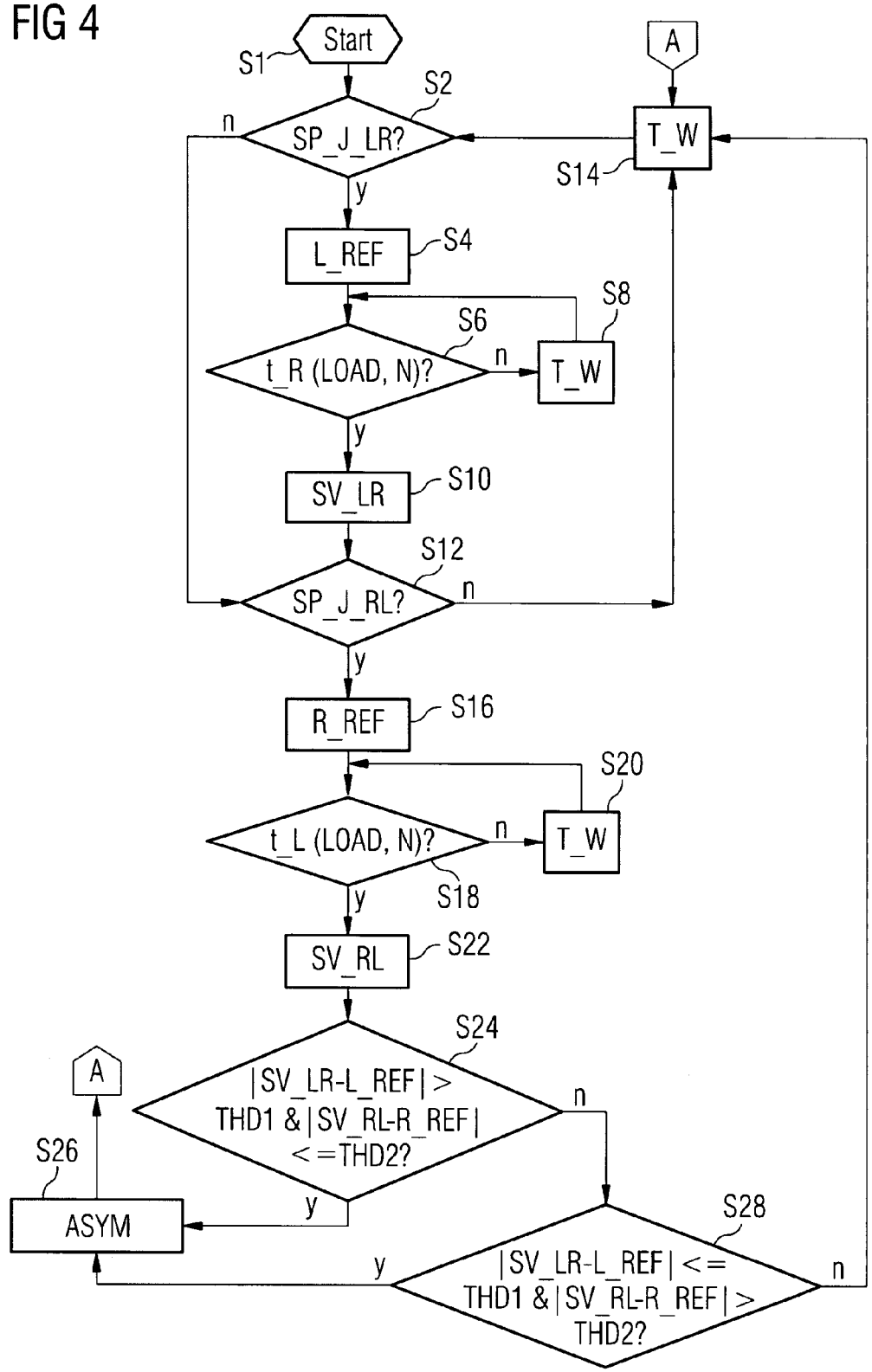

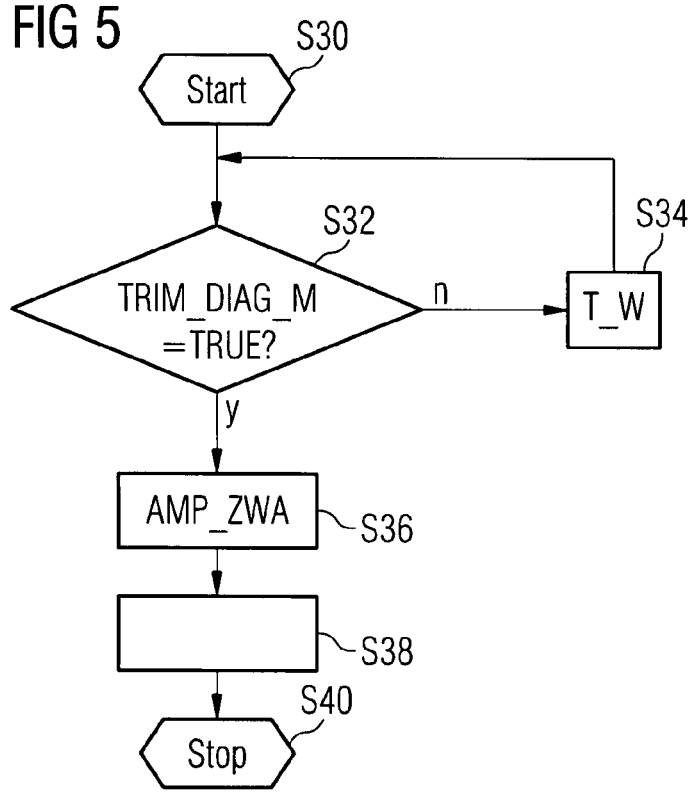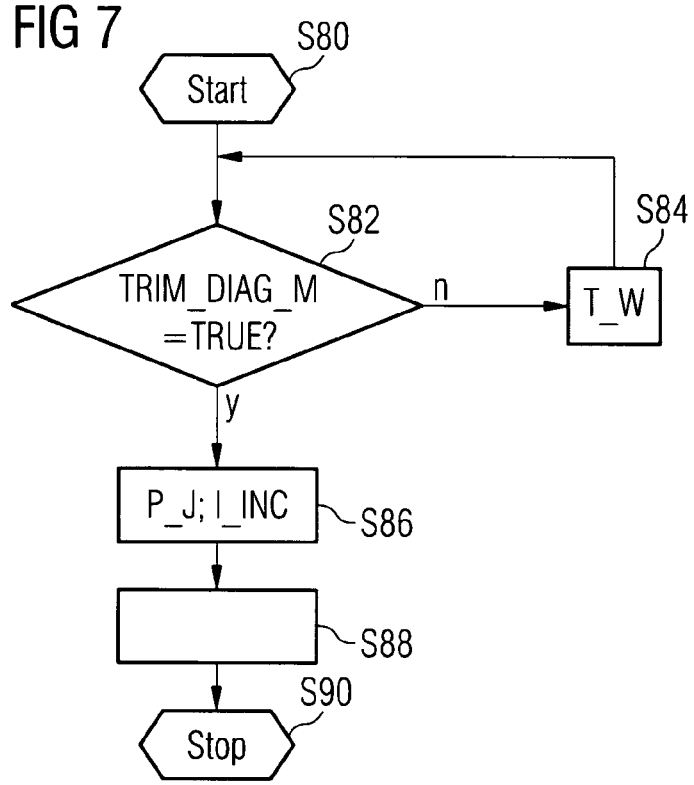

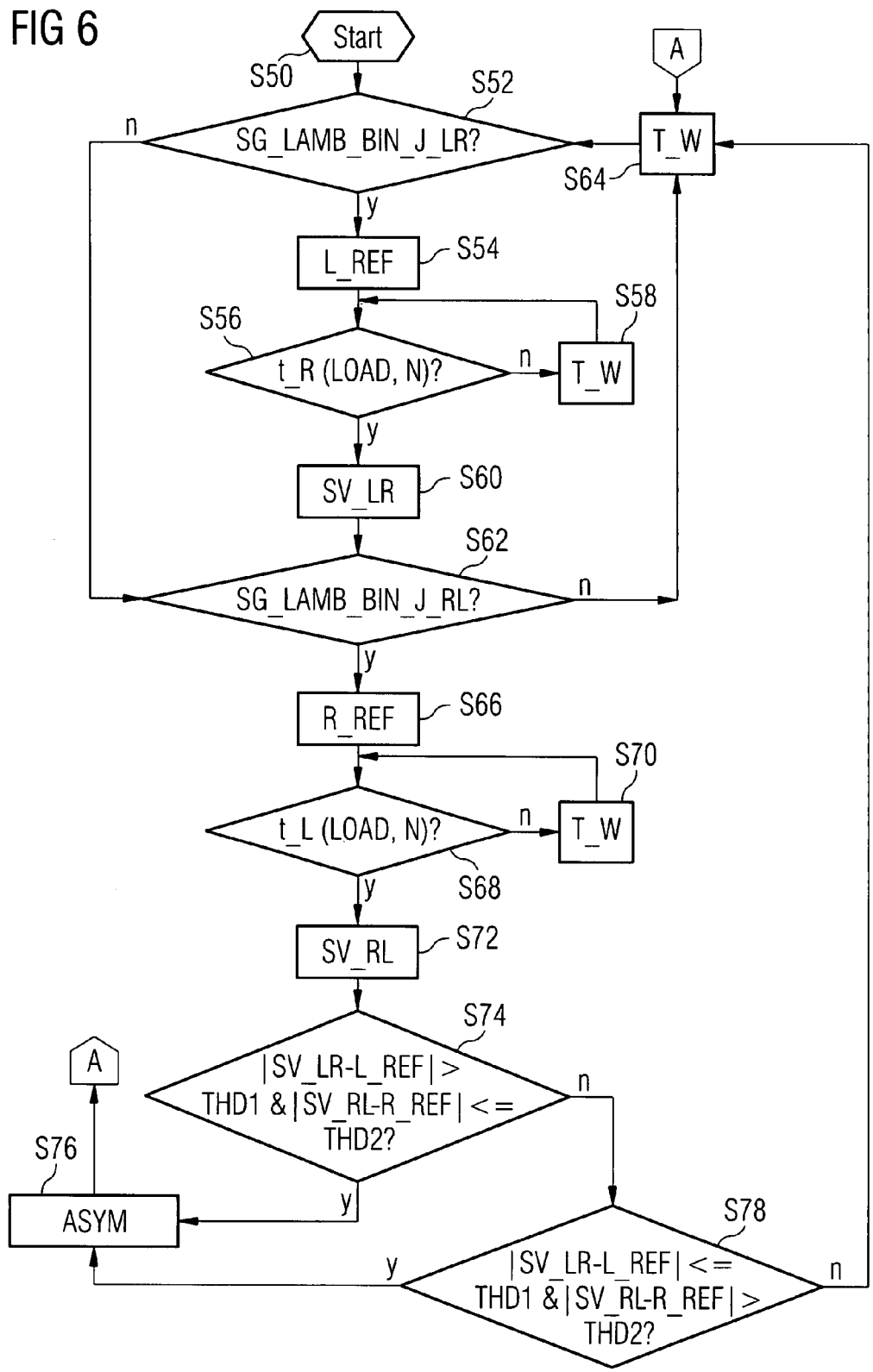

METHOD AND DEVICE FOR MONITORING AN EXHAUST GAS PROBE

CROSS REFERENCE TO RELATED APPLICATIONS

This application claims priority of German Patent Office application No. 10 2006 047 190.3 filed Oct. 5, 2006, which is incorporated by reference herein in its entirety.

FIELD OF INVENTION

The invention relates to a method and a device for monitoring an exhaust gas probe located in the exhaust gas duct of an internal combustion engine.

BACKGROUND OF THE INVENTION

Increasingly stringent legislation governing the permissible noxious emissions from motor vehicles containing internal combustion engines necessitates minimizing the noxious emissions produced while the internal combustion engine is operating. That can be done on the one hand by reducing the noxious emissions occurring during combustion of the air/fuel mixture in the respective cylinder of the internal combustion engine.

On the other hand, exhaust gas aftertreatment systems that convert the noxious emissions produced during combustion of the air/fuel mixture in the respective cylinders into harmless substances are employed in internal combustion engines.

Catalytic converters are used for that purpose which convert carbon monoxide, hydrocarbons, and nitrogen oxides into harmless substances.

Both the selective influencing of the production of noxious emissions during combustion and the conversion of noxious components with a high degree of efficiency by means of a catalytic converter require a very precisely adjusted air/fuel ratio in the respective cylinder.

Known from the technical publication titled "Handbuch Verbrennungsmotor" (appearing in English as "Internal Combustion Engine Handbook"), edited by Richard van Basshuysen and Fred Schäfer, 2nd edition, published by Vieweg & Sohn Verlagsgesellschaft mbH, June 2002, pages 559-561, is a linear lambda control system having a linear lambda probe located upstream of a catalytic exhaust gas converter and having a binary lambda probe located downstream of the catalytic exhaust gas converter. A setpoint lambda value is filtered by means of a filter that takes account of gas travel times and the sensor characteristics. The thus filtered setpoint lambda value is the control variable of a PII$^2$D lambda controller whose correcting variable is a correction in the injected amount.

Known also from the technical publication titled "Handbuch Verbrennungsmotor" (appearing in English as "Internal Combustion Engine Handbook"), edited by Richard von Basshuysen and Fred Schäfer, 2nd edition, published by Vieweg & Sohn Verlagsgesellschaft mbH, June 2002, pages 559-561, is a binary lambda control system having a binary lambda probe located upstream of the catalytic exhaust gas converter. The binary lambda control system includes a PI controller, with the P and I components being stored in engine characteristic maps of engine speed and load. In the case of the binary lambda control system, energizing of the catalytic converter, referred to also as lambda fluctuation, is an implicit product of second-point controlling. The amplitude of the lambda fluctuation is set to approximately three percent.

In connection with lambda controlling, special significance attaches to the lambda probe(s). It is in that regard necessary, for reasons including complying with legal requirements, to suitably monitor the lambda probe.

SUMMARY OF INVENTION

The object of the invention is to provide a method and a device for monitoring an exhaust gas probe, which method or device will enable simple detection of ageing of the exhaust gas probe.

Said object is achieved by the features of the claims.

The invention is characterized by a method and a corresponding device for monitoring an exhaust gas probe located in an exhaust gas duct of an internal combustion engine. As a function of a trim controller diagnosis, a suspicion marker for an asymmetric ageing of the exhaust gas probe is allocated either a "true" or a "false" value and, if the suspicion marker's value is "true", a dynamic diagnosis will be performed based on the exhaust gas probe's measuring signal, on the basis of the results of which diagnosis either an asymmetrically aged or a non-asymmetrically aged exhaust gas probe will be detected.

That makes it possible simply to use the information produced within the scope of the trim controller diagnosis and thereby perform selective detecting of an asymmetrically aged or a non-asymmetrically aged exhaust gas probe. It will also enable asymmetric ageing of the exhaust gas probe to be detected in particular very soon after its occurrence. It is furthermore also possible thereby to make a distinction with regard to an asymmetry in terms of lean/rich or rich/lean on the one hand and, on the other, a fault within the exhaust gas probe or a fault outside the exhaust gas probe.

According to an advantageous embodiment, the dynamic diagnosis comprises the following: Referred to a jump in a variable influencing an air/fuel ratio from a leaner air/fuel ratio to a richer air/fuel ratio, a measuring signal of the exhaust gas probe is registered after a pre-specified lean-rich time delay as a lean-rich signal value and correlated with a lean reference signal value that is registered in correlation with the jump in the modulated setpoint value from a lean air/fuel ratio to a rich air/fuel ratio.

In this connection it is of course also possible to take account of the gas travel times occurring in the internal combustion engine between when a volume of fuel is actually added to a combustion chamber of a respective cylinder and when the respectively allocated exhaust gas packet reaches the respective exhaust gas probe. A storage characteristic of a catalytic exhaust gas converter in the exhaust gas duct or a dynamic characteristic of the internal combustion engine's intake manifold with regard to an air supply to the respective combustion chamber can, where applicable, furthermore also be taken into account in this connection.

Referred to a jump in the variable influencing an air/fuel ratio from a richer air/fuel ratio to a leaner air/fuel ratio, a measuring signal of the exhaust gas probe is after a pre-specified rich-lean time delay registered as a rich-lean signal value and correlated with a rich reference signal value. The rich reference signal value is registered in correlation with the jump in the modulated setpoint value from a rich air/fuel ratio to a lean air/fuel ratio.

Said latter correlating can, for example, preferably consist in the reference signal value's being allocated the measuring signal allocated to the exhaust gas probe immediately before the respective jump or being allocated the minimum or maximum measuring signal occurring between the respective jump and the jump preceding it.

In this connection it is of course also possible to take account of the gas travel times occurring in the internal combustion engine between when a volume of fuel is actually added to a combustion chamber of a respective cylinder and when the respectively allocated exhaust gas packet reaches the respective exhaust gas probe. A storage characteristic of a catalytic exhaust gas converter in the exhaust gas duct can where applicable furthermore also be taken into account in this connection.

As a function of the correlated lean-rich and rich-lean signal values, either an asymmetrically aged or a non-asymmetrically aged exhaust gas probe will be detected. It will hence in that way be possible then to detect a delay that differs depending on the direction of the jump in the response thereto of the exhaust gas probe's measuring signal, and for that to be used for, for example, diagnostic purposes.

It is basically possible alternatively or in addition to detect, as a function of the correlated lean-rich and rich-lean signal values, either a symmetrically aged or a non-symmetrically aged exhaust gas probe. It will hence in that way be possible then to detect a delay that is essentially the same regardless of the direction of the jump in the response thereto of the exhaust gas probe's measuring signal and for that to be used for, for example, diagnostic purposes.

According to a further advantageous embodiment the correlated lean-rich and rich-lean signal values are compared with pre-specified lean-rich or, as the case may be, rich-lean signal values and either an asymmetrically aged or a non-asymmetrically aged exhaust gas probe detected depending on the comparison results. That is especially simple. It is thus furthermore also possible to make a distinction as regards the direction of the asymmetry—from a leaner air/fuel ratio to a richer air/fuel ratio or from a richer air/fuel ratio to a leaner air/fuel ratio.

According to a further advantageous embodiment, the lean-rich time delay and rich-lean time delay are specified as a function of a load and/or rotational speed. A particularly reliable diagnosis over a wide operating range of the internal combustion engine is thus possible.

According to a further advantageous embodiment of the first aspect, the lean-rich time delay and rich-lean time delay are determined as a function of the respective extent of the jump in the variable influencing the air/fuel ratio from a leaner air/fuel ratio to a richer air/fuel ratio or, as the case may be, the jump in the variable influencing the air/fuel ratio from a richer air/fuel ratio to a leaner air/fuel ratio. A particularly reliable diagnosis over a wide operating range of the internal combustion engine is thus possible.

According to a further advantageous embodiment of the first aspect, a setpoint value of the air/fuel ratio in a combustion chamber is modulated by means of a forced excitation signal. As a function of the modulated setpoint value, a volume of fuel requiring to be added is determined within the scope of lambda controlling and a fuel injector is driven in accordance with the volume of fuel requiring to be added. The jump in the variable influencing the air/fuel ratio from a leaner air/fuel ratio to a richer air/fuel ratio is a jump in the modulated setpoint value from a lean air/fuel ratio to a rich air/fuel ratio. The jump in the variable influencing the air/fuel ratio from a richer air/fuel ratio to a leaner air/fuel ratio is a jump in the modulated setpoint value from a rich air/fuel ratio to a lean air/fuel ratio. A particularly simple implementation is possible in that way.

It is particularly advantageous for an amplitude of the forced excitation signal to be increased for performing the steps of registering and collating the lean-rich and rich-lean signal values. A particularly high level of selectivity and robustness in the monitoring of the exhaust gas probe is possible thereby.

According to a further advantageous embodiment, a volume of fuel requiring to be added is determined as a function of the actuating signal of a binary lambda controller and the fuel injector is driven in accordance with the volume of fuel requiring to be added.

Referred to a jump in the actuating signal of the binary lambda controller from a lean air/fuel ratio to a rich air/fuel ratio, a signal value of the exhaust gas probe is registered after a pre-specified lean-rich time delay as a lean-rich signal value and correlated with a lean reference signal value. The lean reference signal value is registered in correlation with the jump in the actuating signal of the binary lambda controller from a lean air/fuel ratio to a rich air/fuel ratio. The jump in the actuating signal of the binary lambda controller from a lean air/fuel ratio to a rich air/fuel ratio thus results in an increasing enrichment of the air/fuel mixture in the combustion chamber of the respective cylinder.

Referred to a jump in the actuating signal of the binary lambda controller from a rich air/fuel ratio to a lean air/fuel ratio, a signal value of the exhaust gas probe is after a pre-specified rich-lean time delay registered as a rich-lean signal value and correlated with a rich reference signal value of the signal that is registered in correlation with the jump in the actuating signal of the binary lambda controller from a rich air/fuel ratio to a lean air/fuel ratio.

Depending on the correlated lean-rich and rich-lean signal values, either an asymmetrically aged or a non-asymmetrically aged exhaust gas probe will be detected.

According to a further advantageous embodiment, at least one of the control parameters of the binary lambda control system is changed for performing the steps of registering and correlating the lean-rich and rich-lean signal values. A particularly high level of selectivity and robustness in the monitoring of the exhaust gas probe is possible thereby.

BRIEF DESCRIPTION OF THE DRAWINGS

Exemplary embodiments of the invention are explained in more detail below with reference to the schematic drawings, in which:

FIG. 4 is a first flowchart of a program executed in the control device, FIG. 5 is a second flowchart of a further program executed in the control device, FIG. 6 is a further flowchart of a further program executed in the control device, FIG. 7 is yet a further flowchart of a further program executed in the control device.

Elements having the same design or function have been assigned the same reference numerals and letters in all the figures.

DETAILED DESCRIPTION OF INVENTION

Figure 1:
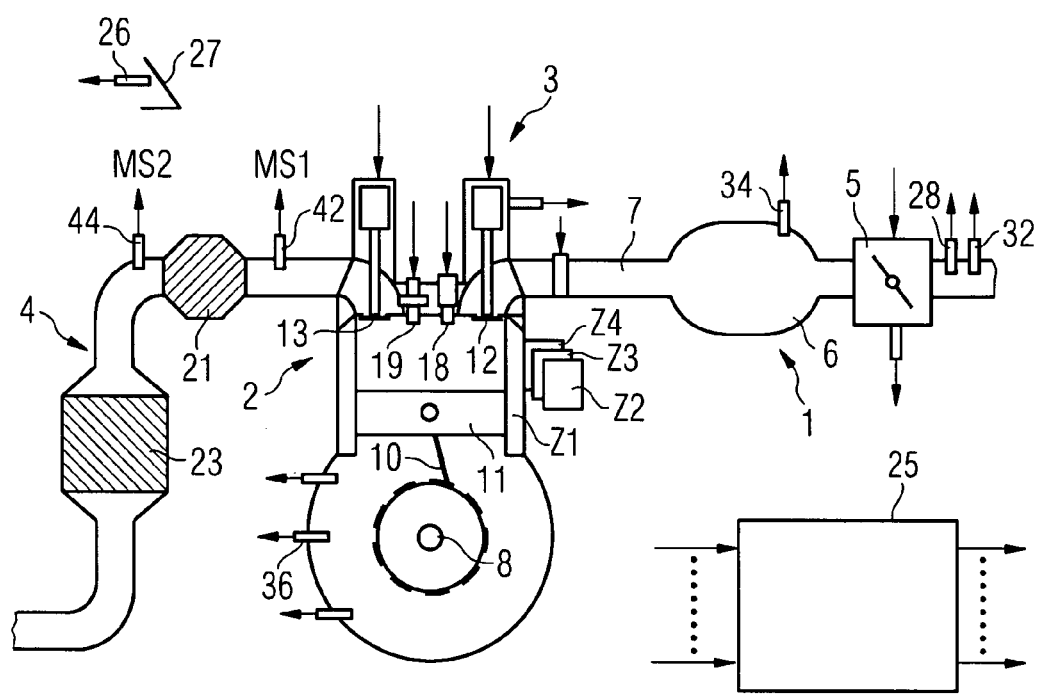
FIG. 1 shows an internal combustion engine having a control device.

An internal combustion engine (FIG. 1) includes an intake manifold 1, an engine block 2, a cylinder head 3, and an exhaust gas duct 4. The intake manifold 1 preferably includes a throttle valve 5 as well as a manifold 6 and an intake pipe 7 that is ducted toward a cylinder Z1 via an intake manifold into the engine block 2. The engine block 2 further includes a crankshaft 8 that is coupled via a connecting rod 10 to the piston 11 of the cylinder Z1.

The cylinder head 3 includes a valve drive having a gas inlet valve 12 and a gas outlet valve 13.

The cylinder head 3 further includes a fuel injector 18 and a spark plug 19. The fuel injector 18 can alternatively also be located in the intake pipe 7.

Located in the exhaust gas duct 4 is a catalytic exhaust gas converter embodied as a three-way catalytic converter 21. Preferably further located in the exhaust gas duct is a further catalytic exhaust gas converter embodied as a NOx catalytic converter 23.

A control device 25 is provided which is allocated sensors that register various measured variables and determine the value of each thereof. Apart from the measured variables, operating variables also include variables derived therefrom. As a function of at least one of the operating variables the control device 25 determines correcting variables that are then converted into one or more actuating signals for controlling the actuators by means of corresponding control drives. The control device 25 can be referred to also as a device for controlling the internal combustion engine or as a device for monitoring an exhaust gas probe.

The sensors are a pedal position indicator 26 that registers a position of an accelerator pedal 27, an mass air sensor 28 that registers an mass air flow upstream of the throttle valve 5, a first temperature sensor 32 that registers an intake air temperature, an intake pipe pressure sensor 34 that registers an intake pipe pressure in the manifold 6, a camshaft-angle sensor 36 that registers a camshaft angle to which a rotational speed is then allocated.

Further provided is a first exhaust gas probe 42 that is located upstream of the three-way catalytic converter 21 or inside the three-way catalytic converter 21 and which registers a residual oxygen content in the exhaust gas and whose measuring signal MS1 is characteristic of the air/fuel ratio in the combustion chamber of the cylinder Z1 and upstream of the first exhaust gas probe prior to oxidizing of the fuel, referred to below as the air/fuel ratio in the cylinders Z1-Z4. The first exhaust gas probe 42 can be located in the three-way catalytic converter 21 in such a way that a part of the catalytic converter volume is located upstream of the first exhaust gas probe 42.

The first exhaust gas probe 42 can be a linear lambda probe or a binary lambda probe.

Further located downstream of the three-way catalytic converter 21 is preferably a second exhaust gas probe 44 that is employed particularly within the scope of trim controlling and is embodied preferably as a simple binary lambda probe.

Depending on how the invention is specifically embodied, any subset of the cited sensors can be present or additional sensors can also be present.

The actuators are, for example, the throttle valve 5, the gas inlet and gas outlet valves 12, 13, the fuel injector 18, or the spark plug 19.

Alongside the cylinder Z1, yet further cylinders Z2 to Z4 are preferably also provided to which corresponding actuators and, where applicable, sensors will then also have been allocated.

Figure 2:
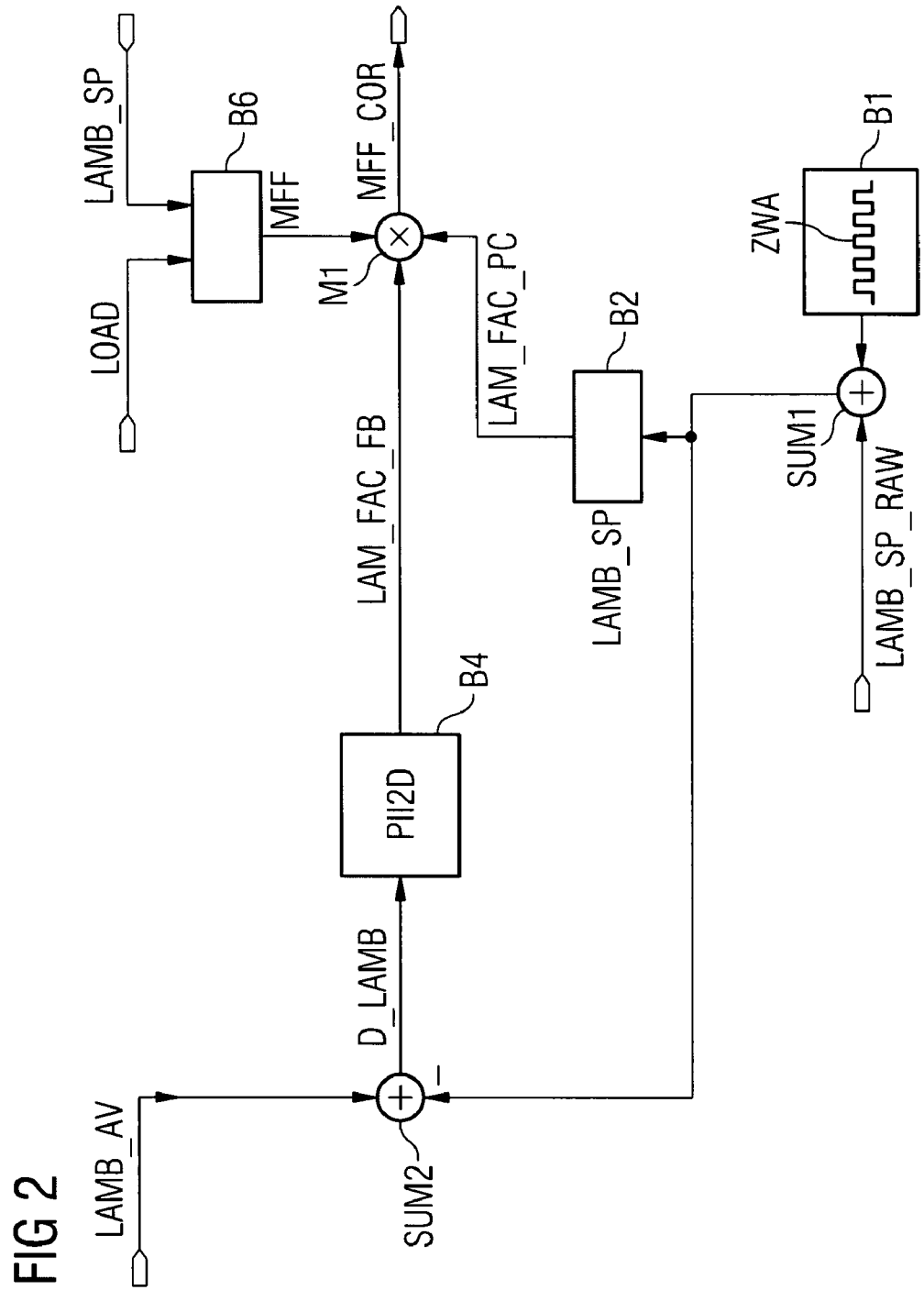
FIG. 2 is a block diagram of a part of the internal combustion engine's control device in a first embodiment.

A block diagram of a part of the control device 25 according to a first embodiment is shown in FIG. 2. In a particularly simple embodiment a pre-specified setpoint value LAMB_SP_RAW of the air/fuel ratio can be a fixed such value. It is, though, preferably determined as a function of, for example, the internal combustion engine's current operating mode such as a homogeneous or shift mode and/or as a function of operating variables of the internal combustion engine. The setpoint value LAMB_SP_RAW of the air/fuel ratio can in particular be pre-specified as being approximately the stoichiometric air/fuel ratio.

A forced excitation signal ZWA is determined in a block B1 and the setpoint value LAMB_SP_RAW of the air/fuel ratio is modulated with the forced excitation signal ZWA at the first summing position SUM1. The forced excitation signal ZWA is a square-wave signal having an amplitude AMP_ZWA. The summing position's output variable will then be a pre-specified air/fuel ratio LAMB_SP in the combustion chambers of the cylinders Z1 to Z4. The pre-specified air/fuel ratio LAMB_SP is ducted to a block B2 that contains a precontrol and generates a lambda-precontrol factor LAMB_FAC_PC as a function of the pre-specified air/fuel ratio LAMB_SP.

At a second summing position SUM2 a control difference D_LAMB which is the input variable supplied to a block B4 is determined as a function of the pre-specified air/fuel ratio LAMB_SP and the registered air/fuel ratio LAMB_AV, possibly corrected by a trim controller intervention, by forming a difference. A linear lambda controller is embodied in the block B4, specifically preferably as a PII$^2$D controller. The correcting variable of the linear lambda controller of the block B4 is a lambda feedback control factor LAM_FAC_FB. Determining of the registered air/fuel ratio LAMB_AV is explained in more detail further below with the aid of FIGS. 5 to 7.

Reference is made with regard to trim controlling to the technical publication titled "Handbuch Verbrennungsmotor" (appearing in English as "Internal Combustion Engine Handbook"), edited by Richard van Basshuysen and Fred Schäfer, 2nd edition, published by Vieweg & Sohn Verlagsgesellschaft mbH, Jun. 2002, pages 559-561, the content of which is included herein in this connection.

The setpoint value LAMB_SP of the air/fuel ratio can also undergo filtering that takes into account, for example, gas travel times or the characteristics of the catalytic exhaust gas converter before the difference is formed at the summing position S2.

Further provided is a block B6 in which a basic volume of fuel MFF requiring to be added is determined as a function of a load LOAD, which can be a mass air flow, for example, and of the modulated setpoint value LAMB_SP. At the multiplying position M1 a volume of fuel requiring to be added MFF_COR is determined by forming the product of the basic volume of fuel MFF requiring to be added, the lambda precontrol factor LAM_FAC_PC, and the lambda feedback control factor LAM_FAC_FB. The fuel injector 18 will then be driven accordingly for adding the volume of fuel MFF_COR requiring to be added.

Figure 3:
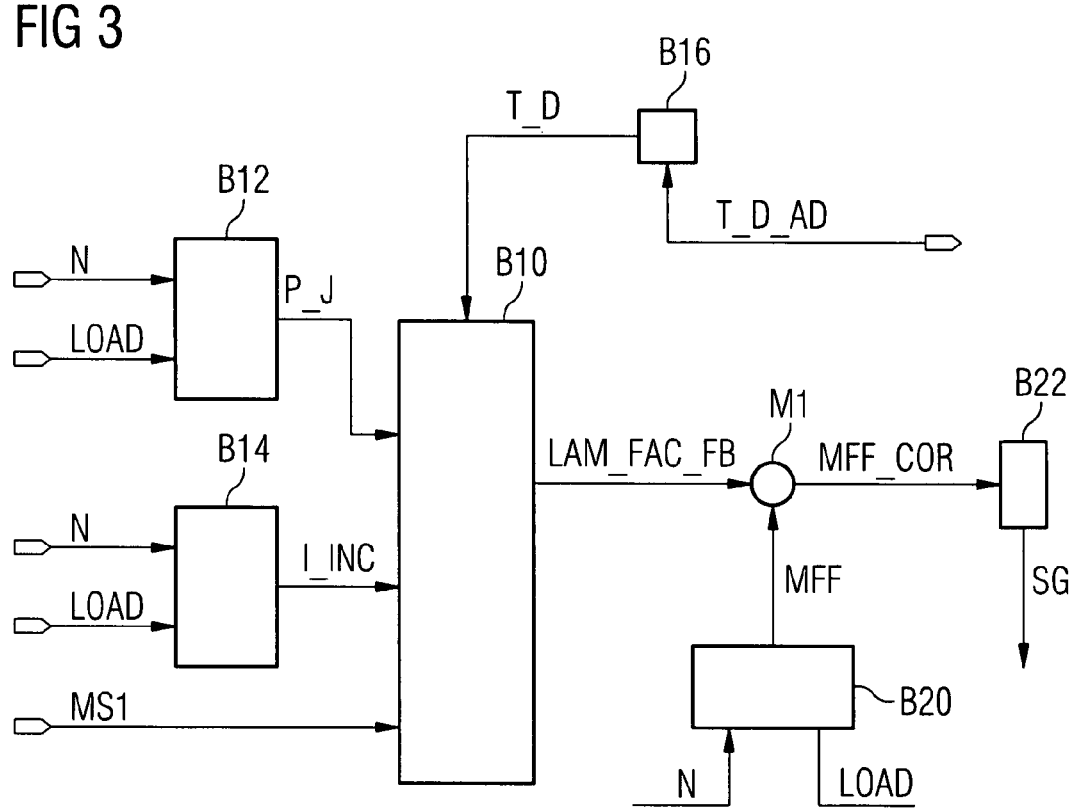
FIG. 3 is a further block diagram of a part of the internal combustion engine's control device according to a second embodiment.

A part of the control device 25 in a further embodiment having a binary lambda control system will be explained in more detail with reference to the block diagram shown in FIG. 3.

A block B10 includes a binary lambda controller. The measuring signal MS1 of the first exhaust gas probe 42 is supplied to the binary lambda controller as the control variable. In this connection the first exhaust gas probe 42 is embodied as a binary lambda probe and the measuring signal MS1 is hence substantially binary in nature, meaning it will assume a lean value if the air/fuel ratio in front of the catalytic exhaust gas converter 21 is lean and a rich value if said ratio is rich. Only in a very narrow intermediate range, which is to say, for example, in the case of an exactly stoichiometric air/fuel ratio, will it also assume intermediate values between the lean and rich value. Owing to the binary nature of the measuring signal MS1 of said type, the binary lambda controller is embodied as a two-point controller. The binary lambda controller is preferably embodied as a PI controller.

A P component is supplied to the block B10 preferably as a proportional jump P_J. A block B12 is provided in which the proportional jump P_J is determined as a function of the rotational speed N and the load LOAD. An engine characteristic map that can be stored permanently is preferably provided for that purpose.

An I component of the binary lambda controller is determined preferably as a function of an integral increment I_INC. The integral increment I_INC is preferably determined in a block B14 also as a function of the rotational speed N and the load LOAD. An engine characteristic map, for example, can likewise be provided for that purpose. The load LOAD can be, for instance, the mass air flow or, for example, also the intake pipe pressure.

A time delay T_D) determined in a block B16 specifically preferably as a function of a trim controller intervention has furthermore also been supplied to the block B10 as an input parameter. The lambda feedback control factor LAM-_FAC_FB is being applied on the binary lambda control's output side. A block B20 corresponds to the block B6 in FIG. 2. An actuating signal SG for the respective fuel injector 18 is generated in a block B22 as a function of the volume of fuel MFF_COR requiring to be added.

A program within the scope of monitoring the exhaust gas probe, specifically the first exhaust gas probe 42 in particular, is launched at a step S1 (FIG. 4). The program is launched and also executed preferably in a stationary operating condition of the internal combustion engine and, even more preferably, also within a pre-specified load and/or rotational speed range. The program is, though, basically also suitable for monitoring the second exhaust gas probe 44. However, for monitoring the second exhaust gas probe 44 an amplitude AMP of the forced excitation signal is preferably suitably increased taking account of the oxygen-storing capacity of the three-way catalytic converter 21. A dynamic diagnosis is performed through executing the program shown in FIG. 4.

Variables can also be initialized at step S1.

A check is performed at a step S2 to determine whether a jump SP_J_LR has taken place in the modulated setpoint value LAMB_SP of the air/fuel ratio from a lean air/fuel ratio to a rich air/fuel ratio. If that is not the case, processing will resume at a step S12, which is explained in more detail further below.

If, conversely, that is the case, then at a step S4 a lean reference signal value L_REF will be allocated as a function of the measuring signal MS1 of the first exhaust gas probe 42. Said value is for that purpose allocated having a pre-specifiable correlation with the jump SP_J_LR of the modulated setpoint value LAMB_SP from a lean air/fuel to a rich air/fuel ratio. That can consist in, for example, allocating a signal value which the first measuring signal MS1 had very shortly before the jump SP_J_LR in the modulated setpoint value LAMB_SP from a lean air/fuel ratio to a rich air/fuel ratio. In this connection account can also have been taken of gas travel times and/or a characteristic of the catalytic exhaust gas converter. Thus a maximum value of the first measuring signal MS1 during the period correlating with a previous jump SP_J_RL in the modulated setpoint value LAMB_SP from a rich air/fuel ratio to a lean air/fuel ratio until the jump SP_J_LR in the modulated setpoint value LAMB_SP from a lean air/fuel ratio to a rich air/fuel ratio can also have been allocated as the lean reference signal value L_REF.

A check is then performed at a step S6 to determine whether a pre-specified lean-rich time delay t_R with reference to detecting the jump SP_J_LR in the modulated setpoint value LAMB_SP from a lean air/fuel ratio to a rich air/fuel ratio has expired. The lean-rich time delay t_R has preferably been specified as a function of a load LOAD and/or the rotational speed N. The load can be represented by, for example, the mass air flow or intake pipe pressure. Thus the lean-rich time delay t_R can be determined, for example, as a function of a corresponding engine characteristic map whose values have been determined preferably empirically.

If the condition of step S6 has not been fulfilled, then the program will branch to a step S8 at which it will pause for a pre-specified waiting time T_W selected as being sufficiently short to insure a desired time resolution in the program's execution. The program can alternatively also pause at step S8 for a pre-specifiable camshaft angle. Following on from step S8, processing will resume again at step S6.

If, conversely, the condition of step S6 has been fulfilled, then a lean-rich signal value SV_LR will be derived at a step S10 as a function of the current measuring signal MS1 of the first exhaust gas probe.

A check is carried out at a step S12 to determine whether a jump SP_J_RL has taken place in the modulated setpoint value LAMB_SP from a rich air/fuel ratio to a lean air/fuel ratio. If that is not the case, then processing will resume at a step S14 at which the program will pause for the pre-specified waiting time T_W corresponding to step S8 before processing is resumed again at step S2. If, conversely, the condition of step S112 has been fulfilled, then a rich reference signal value R_REF will be registered at a step S16 in correlation with the jump SP_J_RL in the modulated setpoint value LAMB_SP from a rich air/fuel ratio to a lean air/fuel ratio. That takes place preferably analogously to the process according to step S4, with a corresponding minimum value then having to be determined with regard to the embodiment variant with reference to the maximum value.

A check is then carried out at a step S18 to determine whether a rich-lean time delay t_L has elapsed since the jump SP_J_RL in the modulated setpoint value LAMB_SP from a rich air/fuel ratio to a lean air/fuel ratio was detected. The rich-lean time delay t_L is preferably likewise determined as a function of the load LOAD and/or the rotational speed N and can likewise be preferably determined as a function of an engine characteristic map.

If the condition of step S18 has not been fulfilled, then the program will pause for the pre-specified waiting time T_W at a step S20 before processing is resumed again at step S18.

If, conversely, the condition of step S18 has been fulfilled, then a rich-lean signal value SV_RL will be determined at a step S22 as a function of the current measuring signal MS1 of the first exhaust gas probe 42.

At a step S24 the lean-rich signal value SV_LR and the rich-lean signal value SV_RL are correlated with the lean reference signal value L_REF or, as the case may be, with the rich reference signal value R_REF, which is preferably done by forming corresponding amounts of corresponding differences, as has also been indicated at step S24. A check is further thus performed at step S24 to determine whether the correlated lean-rich signal value is greater than a pre-specified lean-rich threshold value THD1 and the correlated rich-lean signal value is smaller than or equal to a pre-specified rich-lean signal value. The lean-rich and rich-lean signal values THD1, THD2 can have been determined on the basis of trials, for example, or else pre-specified based on simulations or in another suitable manner. An in each case smaller amount of the correlated lean-rich signal values as well as of the rich-lean signal values therein characterizes a delayed operating characteristic of the exhaust gas probe that can be due to a delay in the jump response and/or a reduced slope steepness of the measuring signal MS1. The lean-rich and the rich-lean signal value THD1, THD2 can basically also assume identical values.

If the condition of step S24 has been fulfilled, then an asymmetric ageing ASYM of the first exhaust gas probe 42 will be detected, specifically at a step S26.

If, conversely, the condition of step S24 has not been fulfilled, then a check will be performed at a step S28 to determine whether the correlated lean-rich signal value is smaller than or equal to the lean-rich threshold value THD1 and the correlated rich-lean signal value is greater than the rich-lean signal value THD2. If that is the case, then an asymmetric ageing ASYM of the first exhaust gas probe 42 will be detected likewise at step S26. That can then be used for diagnostic purposes and, where applicable, result in the entry of a fault for further evaluation. Matching within the scope of lambda controlling can, though, alternatively also take place as a function thereof.

If, conversely, the condition of step S28 has not been fulfilled, then processing will resume at step S14.

Explained with the aid of FIG. 5 is a further program by means of which a two-stage monitoring of the first exhaust gas probe 42 is enabled. The program is launched at a step S30 which can be, for example, close in time to an engine start. A check is performed at a step S32 to determine whether a suspicion marker TRIM_DIAG_M for an asymmetric ageing ASYM of the first exhaust gas probe 42 has been allocated a "true" value TRUE. If that is not the case, meaning that the suspicion marker TRIM_DIAG_M has been allocated a "false" value, then processing will resume at a step S34 at which the program will pause for the pre-specified waiting time T_W before processing is resumed again at step S32.

Depending on a trim controller diagnosis, the suspicion marker TRIM_DIAG_M is allocated either the "true" value TRUE or the "false" value. In particular a size of an integral component of the trim controller intervention is for that purpose evaluated within the scope of the trim controller diagnosis. The amount and sign of the integral component of the trim controller intervention are dependent inter alia on an extent and a direction of the asymmetric ageing ASYM of the first exhaust gas probe 42.

If the condition of step S32 has been fulfilled, then preferably the amplitude AMP_ZWA of the forced excitation signal ZWA will at a step S36 be increased compared with an operation external to the performance of monitoring the first exhaust gas probe 42. The program shown in FIG. 4 will then preferably be executed at a step S38.

It is, though, alternatively also possible at that step to perform any other dynamic diagnosis based on the measuring signal of the respective exhaust gas probe 42, 44. Thus it is also possible within the scope of the dynamic diagnosis to monitor how a filtered modulated setpoint value of the air/fuel ratio is behaving compared with the measuring signal MS1 of the first exhaust gas probe 42. Provided therein is a filter for filtering the modulated setpoint value LAMB_SP by means of which a model of the engine characteristic of the first exhaust gas probe 42 has been realized. The filter can be embodied as, for example, a PT1 filter.

The program can then be terminated at a step S40 or resumed at the step S34.

Processing can, if the condition of step S32 has been fulfilled, alternatively also be resumed directly at the step S38.

The amplitude AMP_ZWA of the forced excitation signal ZWA can furthermore also be increased accordingly during the processing of step S1. Even greater selectivity and robustness in the performance of monitoring the first exhaust gas probe can in that way be insured. Since, however, increasing the amplitude AMP_ZWA of the forced excitation signal ZWA may be associated with increased raw noxious emissions, the procedure according to FIG. 5 will be particularly advantageous as in that context the amplitude AMP_ZWA of the forced excitation signal ZWA will be increased only if the suspicion marker TRIM_DIAG_M for an asymmetric ageing ASYM has already been allocated the "true" value TRUE, meaning when there is an increased probability of an asymmetric ageing ASYM. The asymmetric ageing ASYM will, moreover, then in that way also be able to be detected very soon after its occurrence.

The programs according to FIGS. 4 and 5 are preferably executed in conjunction with linear lambda controlling as explained in more detail with reference to the block diagram in FIG. 2. Said programs can, though, having been suitably adjusted, also be executed externally to linear lambda controlling, for example during quantity controlling of the air/fuel mixture, as is the case, for instance, during shift operation in the case of a gasoline engine or in the case of a diesel engine. In that case the jump (SP_J_LR) in the modulated setpoint value (LAMB_SP) from a lean air/fuel ratio to a rich air/fuel ratio will then generally have been replaced by a jump in the variable influencing the air/fuel ratio from a leaner air/fuel ratio to a richer air/fuel ratio. The jump (SP_J_RL) in the modulated setpoint value (LAMB_SP) from a rich air/fuel ratio to a lean air/fuel ratio will furthermore generally have been replaced by a jump in the variable influencing the air/fuel ratio from a richer air/fuel ratio to a leaner air/fuel ratio. The variable influencing the air/fuel ratio can be, for example, the volume of fuel requiring to be added or the mass air flow or the intake pipe pressure.

The corresponding programs, shown in FIGS. 6 and 7, that will now be explained below are preferably executed in conjunction with a binary lambda control system according to FIG. 3.

The steps of the program shown in FIG. 6 basically correspond to those of the program shown in FIG. 4, with in particular the differences being explained in the following.

The program is launched at a step S50 corresponding to step S1.

A check is performed at a step S52, which basically corresponds to step S2, to determine whether a jump SG_LAM_BIN_J_LR has taken place in the actuating signal of the binary lambda controller from a lean air/fuel ratio to a rich air/fuel ratio. If that is not the case, then processing will resume at a step S62. The actuating signal of the binary lambda controller is preferably the lambda feedback control factor LAM_FAC_FB.

If, conversely, the condition of step S52 has been fulfilled, then processing will resume at a step S54, which corresponds to step S4. Steps S56, S58, and S60 correspond analogously to steps S6, S8, and S10.

Step S62 differs from step S12 in that a check is performed to determine whether a jump SG_LAM_BIN_J_RL has taken place in the actuating signal of the binary lambda controller from a rich air/fuel ratio to a lean air/fuel ratio. If that is not the case, then processing will resume at a step S64, which corresponds to step S14. If, conversely, the condition of step S62 has been fulfilled, then processing will resume at steps S66, S68, where applicable, S70, S72, S74, S76, and S78, which correspond to steps S16, S18, S20, S22, S24, S26, and S28.

The program shown in FIG. 6 is basically also suitable for appropriately monitoring the second exhaust gas probe 44. However, for monitoring the second exhaust gas probe 44 at least one of the control parameters of the binary lambda control system is preferably suitably adjusted taking account of the oxygen-storing capacity of the three-way catalytic converter 21.

The program shown in FIG. 7 basically corresponds to that shown in FIG. 5. The differences are dealt with in the following. Steps S80 to S90 correspond to steps S30 to S40. At step S86, in contrast to step S36, at least one of the control parameters of the binary lambda control system is changed for performing the steps according to the program shown in FIG. 6. In that context the proportional jump T_J is preferably increased and the integral increment I_INC also preferably reduced as compared with normal operation during which no monitoring of the second exhaust gas probe is performed.

The program shown in FIG. 6 is preferably executed at step S88. It is, though, alternatively also possible at step S88 to perform any other dynamic diagnosis based on the measuring signal of the respective exhaust gas probe 42, 44. For example, the dynamic diagnosis can be based on registering and evaluating periods of time taken by the measuring signal between reaching a first threshold value and reaching a second threshold value, and vice versa, with the first threshold value being greater than the second threshold value.

Thus it is also possible within the scope of the dynamic diagnosis to monitor the length of time the measuring signal of the respective exhaust gas probe 42, 44 spends above a rich threshold value and the length of time the measuring signal of the respective exhaust gas probe 42, 44 spends below a lean threshold value.

Figure 8:
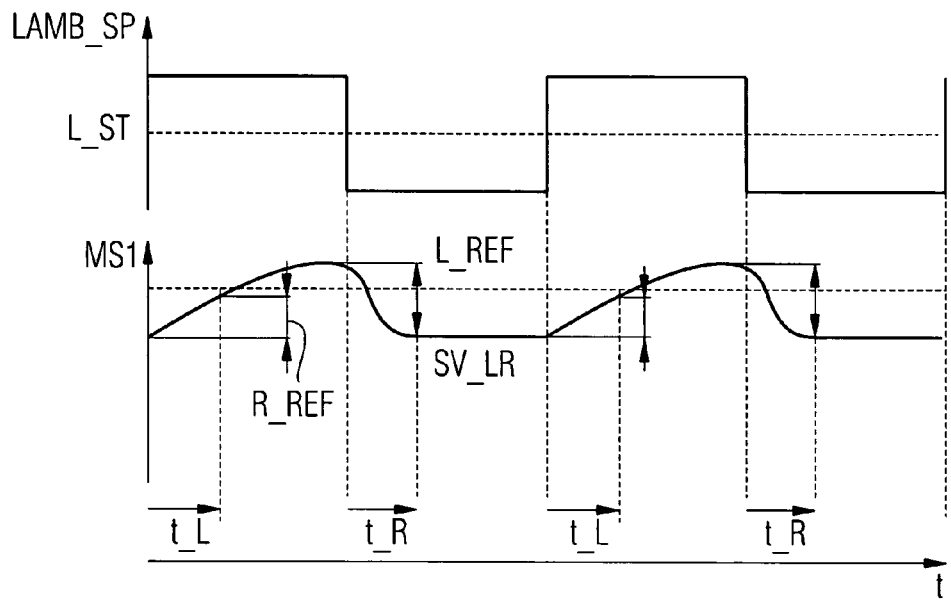
FIG. 8 shows first curves plotted over the time t.
Figure 9:
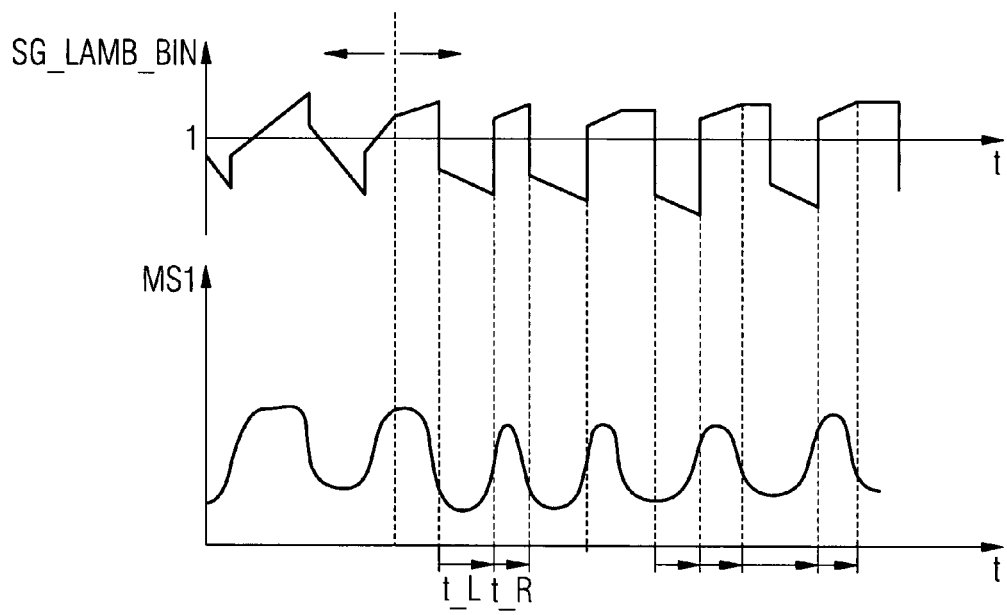
FIG. 9 shows second curves plotted over the time t.

Signal curves are further explained with the aid of FIGS. 8 and 9. FIG. 8 corresponds to signal curves in conjunction with linear lambda controlling during execution of the program shown in FIG. 4. FIG. 9 corresponds to analogous signal curves in the case of binary lambda controlling in conjunction with the execution of the program shown in FIG. 6.

The programs shown in FIGS. 5 and 7 are also basically suitable for monitoring the second exhaust gas probe 44 with respect to asymmetric ageing ASYM.

The invention claimed is:

1. A method for monitoring an exhaust gas probe located in an exhaust gas duct of an internal combustion engine, comprising:
   modulating a setpoint value of an air/fuel ratio using a forced excitation signal during a normal operation of the internal combustion engine;
   allocating either a true or false value to a suspicion marker for an asymmetric ageing of the exhaust gas probe as a function of a trim controller diagnosis;
   if the value of the suspicion marker is "true", triggering a monitoring operation for monitoring the exhaust gas probe, including:
      in response to triggering the monitoring operation for monitoring the exhaust gas probe, increasing an amplitude of the forced excitation signal as compared with the forced excitation signal used during the normal operation of the internal combustion engine;
      performing a dynamic diagnosis based at least on the increased amplitude forced excitation signal and a measuring signal of the exhaust gas probe; and
      detecting the exhaust gas probe as being either asymmetrically aged or non-asymmetrically aged based on the results of the dynamic diagnosis.

2. The method as claimed in claim 1, wherein the dynamic diagnosis comprises:

if a jump in a variable influencing an air/fuel ratio from a leaner air/fuel ratio to a richer air/fuel ratio, a measuring signal of the exhaust gas probe is registered after a pre-specified lean-rich time delay as a lean-rich signal value and correlated with a lean reference signal value that is registered in correlation with the jump in the variable influencing the air/fuel ratio from a leaner air/fuel ratio to a richer air/fuel ratio, if a jump in the variable influencing the air/fuel ratio from a richer air/fuel ratio to a leaner air/fuel ratio, a measuring signal of the exhaust gas probe is registered after a pre-specified rich-lean time delay as a rich-lean signal value and correlated with a rich reference signal value registered in correlation with the jump in the variable influencing the air/fuel ratio from a richer air/fuel ratio to a leaner air/fuel ratio, and either an asymmetrically aged or a non-asymmetrically aged exhaust gas probe is to be detected as a function of the correlated lean-rich and rich-lean signal values.

3. The method as claimed in claim 2, wherein
a set point value of the air/fuel ratio in a combustion chamber is modulated by a forced excitation signal,
as a function of the modulated set point value, a volume of fuel requiring to be added is determined within the scope of lambda controlling and a fuel injector is driven in accordance with the volume of fuel requiring to be added,
the jump in the variable influencing the air/fuel ratio from a leaner air/fuel ratio to a richer air/fuel ratio is a jump in the modulated set point value from a lean air/fuel ratio to a rich air/fuel ratio,
the jump in the variable influencing the air/fuel ratio from a richer air/fuel ratio to a leaner air/fuel ratio is a jump in the modulated set point value from a rich air/fuel ratio to a lean air/fuel ratio.

4. The method as claimed in claim 3, wherein an amplitude of the forced excitation signal is increased for performing the steps of registering and correlating the lean-rich and rich-lean signal values.

5. The method as claimed in claim 1, wherein as a function of the actuating signal of a binary lambda controller a volume of fuel requiring to be added is determined and the fuel injector is driven in accordance with the volume of fuel requiring to be added, the dynamic diagnosis comprises the following:
   if a jump in the actuating signal of the binary lambda controller from a lean air/fuel ratio to a rich air/fuel ratio, a signal value of the exhaust gas probe is to be registered after a pre-specified lean-rich time delay as a lean-rich signal value and to be correlated with a lean reference signal value that is registered in correlation with the jump in the actuating signal of the binary lambda controller from a lean air/fuel ratio to a rich air/fuel ratio,
   if a jump in the actuating signal of the binary lambda controller from a rich air/fuel ratio to a lean air/fuel ratio, a signal value of the exhaust gas probe is to be registered after a pre-specified rich-lean time delay as a rich-lean signal value and to be correlated with a rich reference signal value of the measuring signal that is registered in correlation with the jump in the actuating signal of the binary lambda controller from a rich air/fuel ratio to a lean air/fuel ratio,
   either an asymmetrically aged or a non-asymmetrically aged exhaust gas probe is to be detected as a function of the correlated lean-rich and rich-lean signal values.

6. The method as claimed in claim 5, wherein at least one of the control parameters of the binary lambda control system is changed for performing the dynamic diagnosis.

7. A device for monitoring an exhaust gas probe located in an exhaust gas duct of an internal combustion engine, comprising:
- a plurality of sensor inputs that receive measured values of a plurality of sensors, wherein the plurality of sensors includes the exhaust gas probe;
- a trim controller including instructions for:
  - allocating either a "true" or a "false" value to a suspicion marker for an asymmetric ageing of the exhaust gas probe,
  - if the value of the suspicion marker is "true", triggering a monitoring operation for monitoring the exhaust gas probe, including:
    - in response to triggering the monitoring operation for monitoring the exhaust gas probe, increasing an amplitude of a forced excitation signal as compared with a forced excitation signal used by the internal combustion engine outside of the monitoring operation;
  - performing a dynamic diagnosis based at least on the increased amplitude forced excitation signal and a measuring signal of the exhaust gas probe, and
  - on the basis of the results of the dynamic diagnosis, detecting either an asymmetrically aged or a non-asymmetrically aged exhaust gas probe.

* * * * *